(12) United States Patent
Fujino

(10) Patent No.: US 7,457,101 B2
(45) Date of Patent: Nov. 25, 2008

(54) ELECTRIC DOUBLE LAYER CAPACITOR

(75) Inventor: Takeshi Fujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 11/517,352

(22) Filed: Sep. 8, 2006

(65) Prior Publication Data

US 2007/0053141 A1    Mar. 8, 2007

(30) Foreign Application Priority Data

Sep. 8, 2005    (JP) ............................. 2005-260421

(51) Int. Cl.
   *H01G 9/00*    (2006.01)
(52) U.S. Cl. ...................................... 361/502
(58) Field of Classification Search ................. 361/502, 361/503
   See application file for complete search history.

(56) References Cited

U.S. PATENT DOCUMENTS 3,652,902 A  *  3/1972  Hart et al. .................... 361/502
4,946,663 A      8/1990  Audley et al.
2003/0202316 A1  10/2003  Kawasato et al.
2005/0231892 A1 * 10/2005  Harvey ........................ 361/502

FOREIGN PATENT DOCUMENTS

| JP | 01-139865 A | | 6/1989 |
|----|---|---|---|
| JP | 08037132 A | * | 2/1996 |
| JP | 09-275042 A | | 10/1997 |
| JP | 10-121336 A | | 5/1998 |
| JP | 3156546 B2 | | 2/2001 |
| JP | 2001-217150 A | | 8/2001 |
| JP | 2002-015958 A | | 1/2002 |
| JP | 2002-134369 A | | 5/2002 |
| JP | 2004-006803 A | | 1/2004 |
| JP | 2004-140293 A | | 5/2004 |
| JP | 2004-146610 A | | 5/2004 |

* cited by examiner

*Primary Examiner*—Eric Thomas
(74) *Attorney, Agent, or Firm*—Arent Fox LLP

(57) ABSTRACT

An electric double layer capacitor suppresses gas generation by decomposition of the electrolyte solution in the capacitor and has a superior performance maintaining ratio. In the electric double layer capacitor including activated carbon polarized electrodes and nonaqueous electrolyte solution, an antacid agent consisting of alkali metal salt of an organic acid is contained in the capacitor.

9 Claims, 2 Drawing Sheets

Fig. 1A
Fig. 1B
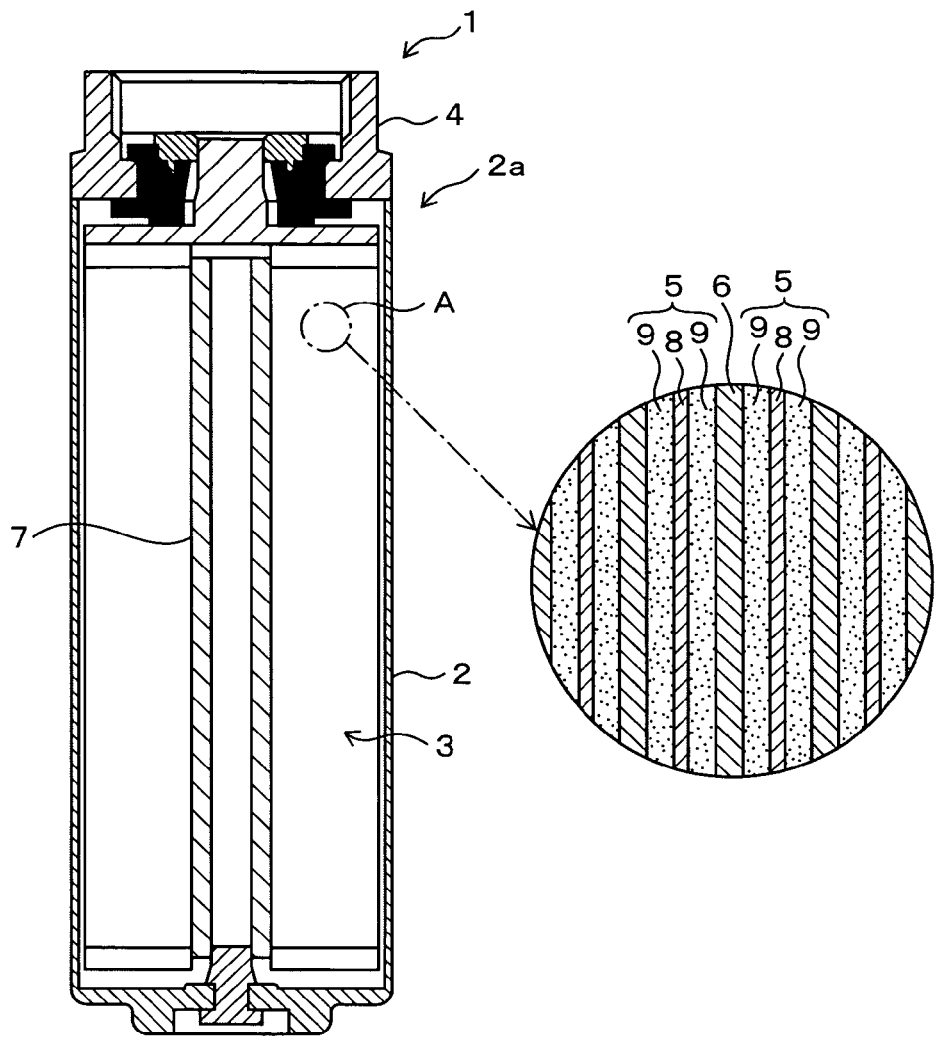
Fig. 2
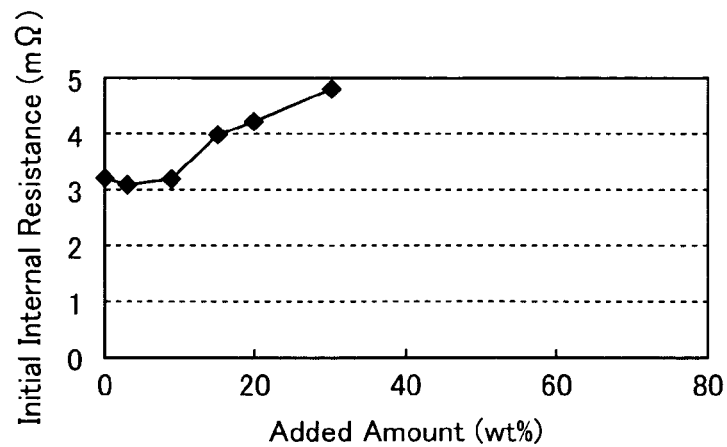

under a wide range of temperatures since there are no chemical reactions during charge and discharge of the capacitor as there are in a conventional secondary battery. Therefore, this type of capacitor is attracting much attention as a new type of storage battery or as a driving power supply for automobiles and devices. In particular, electric double layer capacitors having large capacity and high power are being developed.

ELECTRIC DOUBLE LAYER CAPACITOR

BACKGROUND OF THE INVENTION

1. Field of the Invention

The present invention relates to electric double layer capacitors having large capacitance and high power, and in particular, relates to a technique to prevent gas generation due to decomposition of the electrolyte solution used in the capacitor.

2. Background Art

An electric double layer capacitor has characteristics such as long service life, high cycling characteristics, characteristics of charge and discharge with large current, and operates under a wide range of temperatures since there are no chemical reactions during charge and discharge of the capacitor as there are in a conventional secondary battery. Therefore, this type of capacitor is attracting much attention as a new type of storage battery or as a driving power supply for automobiles and devices. In particular, electric double layer capacitors having large capacity and high power are being developed.

An example of such an electric double layer capacitor is shown in FIG. 1. As shown in FIG. 1, the capacitor 1 includes a cylindrical case with a bottom 2, polarized electrodes 5 contained in the case 2, a separator 6 disposed between the electrodes, and electrolyte solution filled in the case 2. The cylindrical case with a bottom 2 includes an aluminum body having an opening part 2a and an aluminum cover plate 4 which closes the opening part 2a. A part between the outer circumference of the cover plate 4 and inner circumference of the body is sealed with a sealing material. The polarizing electrodes 5 include a mixture of an activated carbon for an electrode, a conductive filler, and a binder.

Conventionally, as the electrolyte solution used as a material of the electric double layer capacitor, an aqueous electrolyte solution and a nonaqueous electrolyte solution can be mentioned. In particular, since high voltage use is required to improve energy density of the electric double layer capacitor, a nonaqueous electrolyte solution which can be charged and discharged at relatively high voltage has been widely used. As the nonaqueous electrolyte solution, a solution in which various conditions such as low-temperature properties, solubility of salts, dielectric constant, safety, electrolyte solution decomposition properties, boiling point, cost and the like are improved is required. As a material which meets these requirements, an electrolyte solution in which propylene carbonate is mainly used as a solvent and a quaternary ammonium salt is added as a supporting salt, may be mentioned.

However, in an electric double layer capacitor having an electrolyte solution containing propylene carbonate and an alkali activated carbon, in the case in which it is charged and discharged repeatedly under high voltage, there is a problem in that the electrolyte solution is gradually decomposed by an electric current under high temperature conditions and carbonic acid gas is generated.

To solve such problems, methods in which various types of materials are added to suppress the decomposition of the electrolyte solution have been suggested. Practically, a nonaqueous electrolyte solution containing γ-butyrolactone or γ-valerolactone in which electrolysis is reduced (see Japanese Unexamined Patent Application Publication No. 2001-217150), a nonaqueous electrolyte solution containing fluorobenzene (see Japanese Unexamined Patent Application Publication No. 2004-6803), a nonaqueous electrolyte solution containing diphenyls (see Japanese Unexamined Patent Application Publication No. 2004-146610) and the like are disclosed.

However, in these solvents, the effects of suppressing gas generation are insufficient. In addition, by depending on additives, the initial capacitance of the capacitor is reduced or internal resistance is increased. Furthermore, the capacitance decreases over time due to the adsorbing of additives or reaction products to additives in the activated carbon. Additionally, dehydration and purification of the additives are required to add the additives to the electrolyte solution, and the cost is increased by the solution containing multiple components.

SUMMARY OF THE INVENTION

The inventor performed researched regarding this problem, and it became obvious that decomposition of the electrolytic solution is caused by slightly acidic compounds generated at the positive electrode, and that gas generation in the electrolyte solution is greatly reduced and the initial capacitance, capacitance maintaining ratio, and internal resistance are improved by a method which is low in cost, that is, dispersing a solid antacid agent (that is, a compound which consumes H+ and HF, and is a base which forms $H_2O$ or $CO_2$ by reaction or is a compound which can adsorb $H^+$) in the capacitor. That is, the present invention was completed in view of the above-described circumstances, and an object of the present invention is to provide electric double layer capacitors in which initial performances are superior, gas generated by decomposition of the electrolyte solution in the capacitor is reduced, the performances are maintained for a long term, and therefore, the above problems are solved.

As the result of researching the above problems, it was found that an antacid agent consisting of salt of organic acid satisfies all of initial capacitance, capacitance maintaining ratio, internal resistance, gas generation suppression effect, and cost requirements. That is, the electric double layer capacitor of the present invention includes activated carbon polarizing electrodes, nonaqueous electrolyte solution, and an antacid agent consisting of alkali metal salt of an organic acid contained in the capacitor.

According to the electric double layer capacitor of the present invention having the above structure, since the antacid agent consisting of alkali metal salt of an organic acid is contained in the capacitor, an acidic compound which is a material causing decomposition of the electrolyte solution and which is generated and accumulates with repeated charge and discharge of the electric double layer capacitor, can be neutralized. As a result, suppression of effects of gas generation caused by the decomposition of the electrolyte solution can be improved in comparison with conventional techniques. In addition, initial capacitance, capacitance maintaining ratio and internal resistance can also be improved in comparison with conventional techniques. Furthermore, since the antacid agent consisting of alkali metal salt of an organic acid is used, the problem of production cost of the antacid agent and the problem of increasing of capacitor cell weight can also be solved.

The antacid agent is contained in the capacitor described as above, and in particular, it is preferably contained in the activated carbon polarized electrode. Since the acidic compound which causes the gas decomposition is formed in the electrode, in the above structure, the acidic compound is neutralized and the gas decomposition is effectively suppressed.

It is preferable that the alkali metal salt of organic acid be contained in the nonaqueous electrolytic solution in addition to the electrode. In the case in which the antacid agent is dispersed in the electrolytic solution, it can react with acidic compounds, since part of the acidic compound produced at an interface between the electrode and the electrolytic solution is dispersed in the electrolytic solution.

The alkali metal salt of an organic acid is preferably R-COOM, R-OM, or $RSO_3M$ (M is sodium or potassium, and R is alkyl group having a carbon number of 4 or more), and in particular, benzoate is more preferable. It is believed that the reason is that fluoride and aromatic carboxylic acid which is relatively stable is formed by neutralizing with the acidic compound and does not form water due to the antacid agent. In addition, it is desirable that the alkali metal salt of an organic acid be potassium salt or sodium salt.

It is preferable that the benzoate be contained at 0.5 to 30 weight % in the above nonaqueous electrolytic solution. In the case in which the content is in this range, both an antacid effect of $H^+$ and capacitance can be ensured. When the content is below 0.5 weight %, the antacid effect cannot be sufficiently obtained, and in contrast, when the content exceeds 30 weight %, capacitance is reduced since the added amount of the activated carbon cannot be ensured.

In addition, it is desirable that the anion contained in the nonaqueous electrolytic solution be at least one of $BF_4^-$ and $PF_6^-$, since the effect of suppressing hydrolysis of the electrolytic solution is greatest.

BRIEF DESCRIPTION OF THE DRAWINGS

FIGS. 1A and 1B are sectional views showing an embodiment of an electric double layer capacitor according to the present invention.

FIG. 2 is a graph showing the relationship of the initial internal resistance and the amount of antacid agent contained in the Example and Comparative Example.

BEST MODE FOR CARRYING OUT THE INVENTION

Figure 3:
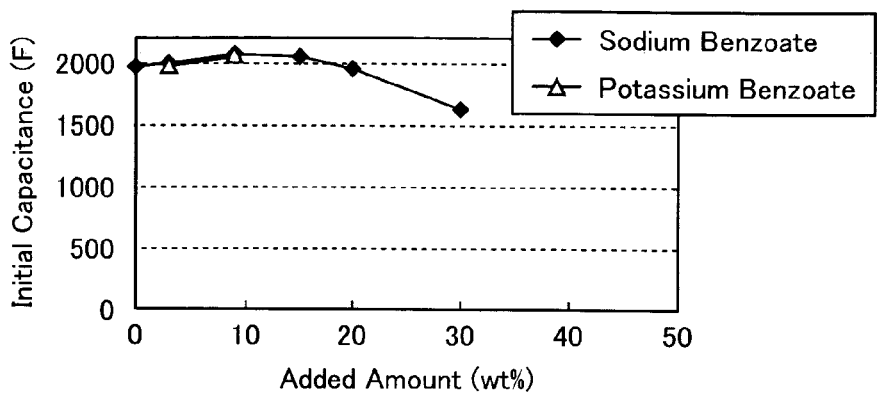
FIG. 3 is a graph showing the relationship of the initial capacitance and the amount of antacid agent contained in the Example and Comparative Example.

In the following, a preferred embodiment of the electric double layer capacitor of the present invention will be explained. First, a production method of the electric double layer capacitor in Examples of the present invention will be explained with reference to FIGS. 1A and 1B and next, each component will be explained in detail.

Production Method for Electric Double Layer Capacitor

First, an activated carbon, an antacid agent, a conductive material, and a binder are weighed at desired ratio and are kneaded together. An electrode sheet 9 having a width of 110 mm is formed by rolling the kneaded mixture in a sheet shape, and a polarized electrode 5 is produced by sticking the sheets 9 on both surfaces of a collector 8 which is made of aluminum.

Next, a separator 6 made of polyester is sandwiched between two polarized electrodes 5 and thereby, an electrode element 3 is produced. The electrode element 3 is rolled in a longitudinal direction, and it is contained on the outer surface of a hollow rolled core 7 in a cylindrical case 2 having a bottom made of aluminum, so that the polarized electrode 5 and the separator 6 are wound around the outer surface of the core 7. Then, the cylindrical case 2 having a bottom in which the electrode element 3 is contained is dried at 200° C. for 24 hours under reduced pressure of 5 Pa.

Subsequently, nonaqueous electrolytic solution is impregnated into the electrode element 3 contained in the cylindrical case 2 having a bottom, and the opening 2a of the case 2 is sealed by a cover 4, and thereby, an electric double layer capacitor 1 which has a structure as shown in FIGS. 1A and 1B is produced. Here, the above production method is one embodiment of methods for producing the electric double layer capacitor of the present invention, and production methods of the capacitor are not limited only to this method.

Antacid Agent

The antacid agent (alkali metal salt of organic acid) used in the present invention is a compound which adsorbs $H^+$, and specifically, sodium carboxylate, potassium carboxylate, sodium sulphonate, potassium sulphonate, etc., can be used, and in particular, sodium benzoate, and potassium benzoate are preferable. A mechanism for minimizing the effects of decomposition of the electrolyte solution is believed to be as follows. In the capacitor, $BF_4^-$ is attracted to water remaining in voids of the activated carbon during charging, and they react to generate HF by hydrolysis in a reaction site of the voids of activated carbon of the positive electrode. The generated $H^+$ behaves as a catalyst of decomposition reaction of PC. At the same time, $H^+$ migrates to the negative electrode and generates hydrogen, thereby increasing leakage current. In this way, self-discharge is increased, or an electrochemical oxidizing reaction is promoted, promoting gas generation reactions. One reason the present invention is effective is that the decomposition rate of the electrolyte solution solvent is reduced by neutralizing the generated $H^+$ catalyst, thereby reducing self-discharge and the generated amount of decomposition gas, and thereby improving initial efficiency and durability. This effect is obtained by reacting with small amounts of HF so as to form NaF or KF and benzoic acid, in the case in which benzoate is added in the electrode or in the electrolytic solution. It is believed that the benzoic acid formed is stabilized by adsorbing on the activated carbon.

The added amount of the antacid agent in the present invention is preferably 0.5 to 30 weight % to weight of the activated carbon when it is added to the activated carbon, and it is preferably 0.5 to 30 weight % to weight of the electrolytic solution when it is added to the electrolytic solution. In the case in which the added amount of the antacid agent is below 0.5 weight %, an antacid effect of $H^+$ cannot be sufficiently obtained. In contrast, in the case in which the added amount of the antacid agent is increased, it is necessary to increase the added amount of conductive material, and initial capacitance is lowered of the capacitor cell, since volume ratio of the activated carbon in the electrode is decreased by increasing ratio of the antacid agent in the electrode. It is more preferable that the added amount be 3 to 30 weight % since the effects of suppressing the generation of gas is remarkable. It is unknown for certain why benzoate has the highest effect among the organic acids; however, it is believed that the reason is that fluoride and aromatic carboxylic acid which is comparatively stable are formed by reacting and do not form water by the antacid agent.

In addition, when benzoate is added, initial capacitance can be improved since the density of the electrode compact in the activated carbon electrode is greatly improved. The reason for this is not known for certain; however, it is believed that this is due to the effects in which the density of the electrode material is increased by synergistic effect with activated carbon or binder in compacting the activated carbon electrodes. The antacid agent in the present invention is suitably mixed with the activated carbon, and in particular, large effects can be obtained by adding it in the electrode that uses alkali activated carbon. Additionally, a polarized electrode may be made of metal oxide fine particles, carbide powder, graphite powder, or conductive polymer, in addition to the active carbon. In the case in which the added amount of the antacid agent is 1 weight % or more, a significant effect is exhibited; however, only the effect of formability of the electrode can be obtained, even if the amount is small, and it is effective when it is 0.5 weight % or more.

As an additional method of the antacid agent, a dry type method and a wet type method can be used. As a dry type method, a method for mixing antacid agent powder and activated carbon powder using mixers, ball mills, etc., can be used. Then, conductive material and binder are added thereto and the electrode is compacted by kneading and rolling the mixture. Here, the mixing process may be omitted and each component may be kneaded. In addition, as a wet method, a method in which the antacid agent is mixed with the activated carbon by dispersing in a small amount of water or organic solvent, or a method in which the antacid agent is dispersed and mixed as a slurry containing activated carbon, antacid agent and binder, can be used. An electrode sheet is produced by coating and drying the above solution or slurry. Here, in the wet type method, water easily remains in the activated carbon or electrodes, even if the electrode sheet is dried sufficiently.

It is desirable that the particle diameter of the antacid agent be not more than that of the activated carbon, since the antacid agent will enter between the activated carbon particles, and capacitance per electrode volume will not be reduced even if the added amount is increased. The average particle diameter of the antacid agent is not more than 100 µm, preferably not more than 10 µm, and more preferably from about 10 nm to 10 µm.

The antacid agent can be contained in both the positive electrode and negative electrode; however, sufficient effects can be obtained by adding the antacid agent to the positive electrode, since the acidic material due to the decomposition of the electrolyte solution is generated at the positive electrode. Therefore, from the viewpoints of cost and the production process, it is not necessary to add the antacid agent in the negative electrode. In addition, each amount of the antacid agent added can differ at the positive and the negative activated carbon electrodes; however, it is preferable that the amount of the antacid agent at the positive electrode be larger than that at the negative electrode for a similar reason.

The antacid agent may be used alone or in combination with two kinds or more from the viewpoints of cost, and in addition, type or mixing ratio of the antacid agent added to the positive and negative electrodes may be altered. In the following Examples, sodium benzoate and potassium benzoate produced by Wako Pure Chemical Industries, Ltd., were used as the antacid agent, and the antacid agent was added to the activated carbon powder and was mixed by a ball mill for 1 hour, and the mixture was further mixed after adding conductive material and binder.

Activated Carbon Electrode

As an activated carbon for a polarized electrode used in the capacitor of the present invention, gas activated carbon, specifically, steam activated carbon made of carbonaceous material such as cellulose in coconut husks, etc., thermosetting resin of isotropic pitch prepared from coal or petroleum coke, phenol, etc., can be used. More specifically, an activated carbon in which a specific surface area is 100 to 2,500 $m^2/g$, or an activated carbon in which a micropore pore volume of 2 nm or less is 0.05 to 1.2 mL/g, is preferable. That is, it is an activated carbon which can solve the problem due to residual water in pore interiors, and it is not limited to an activated carbon of a specific type or having specific characteristics.

In the present invention, an alkali activated carbon, and a mixed powder of an alkali activated carbon and a steam activated carbon can be used besides the steam activated carbon. In particular, when an alkali activated carbon made of graphitizable carbonaceous material is used, the effect of the present invention is large. As a graphitizable carbonaceous material, mesophase pitch, in particular distilled pitches such as those which are petroleum based or coal based, coke containing the pitch, needle coke, chemically synthesized pitch, PVC pitch, or the like are desirable. By alkali activating these carbonaceous materials, activated carbon which is used in the present invention is obtained. A practical alkali activating method is disclosed in, for example, Japanese Unexamined Patent Applications Publications No. 2002-15958, No. 2002-134369, No. Hei 09-275042, No. Hei 10-121336, and No. Hei 01-139865.

In the alkali activated carbon and in particular, the alkali activated carbon made of graphitizable carbon material, since pore width is small and carbon surface is constituted by mainly an edge surface, strongly adsorbed water cannot be desorbed even if it is sufficiently dried, and an amount of the adsorbed water is different from that of the steam activated carbon, and as a result, the above effect is exhibited more remarkably than in the steam activated carbon. Therefore, an alkali activated carbon made of graphitizable carbon material having a specific surface area of 2,000 $m^2/g$ or less, in particular, 1,200 $m^2/g$ or less, is preferable, since it has many micropores. In the case in which the specific surface area of the activated carbon is extremely low, it is necessary to apply a high voltage of 3.0 V or more in order to obtain capacitor capacity, and the electrolytic solution is impaired by the high voltage application, so as to deteriorate performance thereof. Therefore, when the specific surface area of activated carbon is in a range from 100 to 800 $m^2/g$, the effect of suppressing decomposition is remarkable.

The alkali activated carbon used in the present invention is produced by heating a synthetic mesophase pitch to form a graphitizable carbon material, by alkali-activating the graphitizable carbon material using solid potassium hydroxide, and by washing sufficiently. Specifically, a production method for the activated carbon includes carbonizing carbon material in a nitrogen gas stream at 700° C. for 1 hour, crushing the carbonized carbon material, so as to produce a graphitizable carbon material, alkali-activating the graphitizable carbon material using solid potassium in a nitrogen gas stream first at 400° C. for 3 hours and subsequently at 750° C. for 3 hours, and by sufficiently washing. More specifically, a method disclosed in Japanese Unexamined Patent Application Publication No. 2002-134369, can be used.

The activated carbon produced by the above method has a specific surface area of 790 $m^2/g$, a micropore volume measured by a t-plot method of 0.34 ml/g, an amount of functional group of the total surface measured by a titration method of 0.7 meq/g, a K amount in the activated carbon of 200 ppm, and an average particle diameter of 10 µm. The electrodes are produced using the alkali activated carbon and were evaluated. It is preferable that the amount of functional group of the total surface be 0.01 to 1.0 meq/g, since when it is too large, residual water is increased and the electrolytic solution is easily decomposed. Here, the specific surface area is measured by a nitrogen gas adsorption method in which about 0.5 g of the activated carbon is vacuum-deaerated at 300° C. for 6 hours so as to adsorb nitrogen gas. The micropore volume is calculated by measuring micropore volume of 2 nm or less, using a t-plot method (B. C. Lippens, J. H. de Boer, J. Catalysis, 4319 (1965)). The amount of the functional group of the surface can be determined by well-known methods (for example, Surfaces Vol. 34, No. 2 (1996); Catal. 16, 179 (1966)). Specifically, about 2 g of activated carbon sample is put into a 100 ml Erlenmeyer flask and 50 ml of N/10 alkali reagent sodium ethoxide is added thereto, and then the mixture is filtrated after 24 hours shaking, and unreacted alkali reagent is titrated by N/10 hydrochloric acid, and thereby the amount of functional group is determined. The K amount is determined by ashing 20 g of activated carbon at 700° C. for 48 hours or more and by using atomic absorption spectroscopy on the ash content in the aqueous solution of the activated carbon.

Electrolyte Solution

The nonaqueous electrolytic solution of the present invention is made of electrolyte and aprotic solvent, and as an electrolyte anion, an anion containing at least F such as $BF_4^-$, $PF_6^-$, can be used. The cation is not limited to a specific cation, and as a cation, a quaternary ammonium cation; pyrrolidinium cation such as dimethylpyrrolidinium, methylethyl pyrrolidinium, diethyl pyrrolidinium, etc.; an alkyl imidazolium cation such as ethylmethyl imidazolium, etc.; a Li ion, etc., can be used. It is desirable that the concentration of electrolyte in the electrolyte solution be in a range of from 0.8 to 6.0 mol/L to maintain an ion amount necessary to form an electric double layer, and to obtain sufficient electrical conductivity. These electrolytes can be used alone or in a mixture of several kinds.

A solvent of the electrolytic solution is a solvent including aprotic solvent and as a solvent, well-known solvents can be used. Specifically, as an aprotic solvent, a chain carbonate such as dimethyl carbonate, ethylmethyl carbonate, diethyl carbonate, etc., ethylene carbonate, 2,3-dimethylethylene carbonate, butylene carbonate, sulfone such as sulfolane, 3-methyl sulfolane, 2,4-dimethyl sulfolane, etc., can be used. In particular, effects of the present invention are great when carbonates are used as a solvent. The electrolytic solution used in the present invention can be used alone, or in a mixture as disclosed in Japanese Patent No. 3156546 or Japanese Patent Unexamined Application Publication No. 2004-140293.

In the present invention, a 1.8 mol/L propylene carbonate solution of triethylmethylammonium tetrafluoroborate $[(C_2H_5)_3CH_3NBF_4]$ was used. The amount of water in the electrolyte solution prepared was measured by the Karl Fischer's method and was confirmed to be not more than 30 ppm.

Capacitor Cell Case

For the case for the electric double layer capacitor of the present invention, one of any shape, such as a cylinder, cube, or cuboid can be used. In the case in which a cylindrical case is used, positive and negative electrodes are formed on both surfaces of a collector sheet, and the collector sheet is rolled with a separator and is put in a cylindrical case. In such a rolled-type device structure, the size of the device can be freely changed by controlling the width and length of the electrodes. Furthermore, by rolling tightly, the electrodes in the device can be compressed and the filled ratio of activated carbon can be improved. This cylindrical cell has an improved energy density per volume Wh/L. In the present invention, for example, a capacitor cell case made of aluminum having diameter of 40 mm and length of 120 mm can be used. The structure of the capacitor cell is not particularly limited, and in the case in which a cubic or cuboid case is used, electrodes are stacked and inserted into the case. In this case, the volume efficiency of the capacitor module in which plural cells are connected can be improved compared to the cylindrical case. As a material of the case in which the device is inserted, any kind of material can be used; however, volume change during charging and discharging of not more than 1% is desirable, and practically, Al, Ti, Mg, Fe, Cr, Ni, Mn, Ca, Zr, or an alloy containing at least one of these metals can be used.

EXAMPLES

In the following, the electric double layer capacitor of the present invention will be explained in more detail by way of Examples and Comparative Examples.

Example 1

Alkali activated carbon having a specific surface area of 790 $m^2/g$, micropore volume by t-plot method of 0.34 ml/g, an amount of surface functional group by titration method of 0.7 meq/g and an amount of K in the activated carbon of 200 ppm, antacid agent (sodium benzoate, produced by Wako Pure Chemical Industries, Ltd.), conductive material (trade name: Denkabilack, produced by Denki Kagaku Kogyo K.K.), binder (PTFE, trade name: 6J, produced by Du Pont-Mitsui Fluorochemicals Company, Ltd.) were weighed so as to have a weight ratio in electrode composition of 87:3:5:5. The activated carbon and the antacid agent were mixed by a ball mill for 1 hour, then the conductive material and the binder were added, and the mixture was kneaded, rolled and dried, and a sheet electrode having a thickness of 140 μm of Example 1 was produced. Density of the electrode after drying was 0.86 $g/cm^3$.

Example 2

An electrode of Example 2 was produced in the same manner as that in Example 1, except that the composition ratio of alkali activated carbon, antacid agent, conductive material, and binder was set to 81:9:5:5. Density of the electrode after drying was 0.94 $g/cm^3$.

Example 3

An electrode of Example 3 was produced in the same manner as that in Example 1, except that the composition ratio of alkali activated carbon, antacid agent, conductive material, and binder was set to 76.5:5:13.5:5. Density of the electrode after drying was 0.96 $g/cm^3$.

Example 4

An electrode of Example 4 was produced in the same manner as that in Example 1, except that the composition ratio of alkali activated carbon, antacid agent, conductive material, and binder was set to 72:18:5:5. Density of the electrode after drying was 0.97 $g/cm^3$.

Example 5

An electrode of Example 5 was produced in the same manner as that in Example 1, except that the composition ratio of alkali activated carbon, antacid agent, conductive material, and binder was set to 63:27:5:5. Density of the electrode after drying was 0.97 $g/cm^3$.

Example 6

An electrode of Example 6 was produced in the same manner as that in Example 1, except that potassium benzoate (produced by Wako Pure Chemical Industries, Ltd.) was used as an antacid agent. Density of the electrode after drying was 0.86 g/cm$^3$.

Example 7

An electrode of Example 7 was produced in the same manner as that in Example 2, except that potassium benzoate (produced by Wako Pure Chemical Industries, Ltd.) was used as an antacid agent. Density of the electrode after drying was 0.94 g/cm$^3$.

Example 8

An electrode of Example 8 was produced in the same manner as that in Example 2, except that steam activated carbon (trade name: RP20, produced by Kuraray Chemical Co., Ltd.) was used as an activated carbon and the composition ratio of steam activated carbon, antacid agent, conductive material, and binder was set to 78.3:7.74:10:6. Density of the electrode after drying was 0.71 g/cm$^3$.

Example 9

An electrode of Example 9 was produced in the same manner as that in Example 1, except that the antacid agent was not used and the composition ratio of alkali activated carbon, conductive material, and binder was set to 90:5:5. Density of the electrode after drying was 0.84 g/cm$^3$. Antacid agent was added by the electrolytic solution in which 10 g sodium benzoate was dispersed in 0.2 kg of the electrolytic solution in the subsequent capacitor cell filling process.

Comparative Example 1

An electrode of Comparative Example 1 was produced in the same manner as that in Example 1, except that the antacid agent was not used and the composition ratio of alkali activated carbon, conductive material, and binder was set to 90:5:5. Density of the electrode after drying was 0.84 g/cm$^3$.

Comparative Example 2

An electrode of Comparative Example 2 was produced in the same manner as that in Comparative Example 1, except that steam activated carbon (trade name: RP20, produced by Kuraray Chemical Co., Ltd.) was used as an activated carbon and the composition ratio of steam activated carbon, conductive material, and binder was set to 84:10:6. Density of the electrode after drying was 0.67 g/cm$^3$.

Performance Measurement and Evaluation

The activated carbon electrode sheets obtained above were arranged on both surfaces of rectangular collector sheets of aluminum foil by a conductive adhesive. In this way, a positive electrode and a negative electrode were prepared, and these electrodes were rolled with a separator having a thickness of 90 μm to prepare a device. This device was inserted into an Al cylindrical case having a diameter of 40 mm and a length of 120 mm. A terminal part was welded to seal it, and a capacitor cell was obtained. The cylindrical capacitor cell was dried in a vacuum at 200° C., and the electrolyte solution was filled in this cell. Then, an aging treatment of applying a constant voltage of 2.7 V was performed for 6 hours at 65° C. Constant current discharging of 30 A was performed by an energy equivalent method, and initial capacitance and initial internal resistance of the capacitor were measured. The measurement results are shown in Table 1.

Capacitor cells of Examples and Comparative Examples were put in a constant temperature oven maintained at 65° C., a voltage of 2.5 V was applied to these capacitor cells, and the cells were maintained in this condition for 1000 hours to perform an accelerated endurance test. After the test, the temperature of the cells was decreased to 25° C. to measure capacitance. Capacitance maintaining ratio after the endurance test compared to initial efficiency was calculated by an energy exchange method. The results are shown in Table 1 as "Capacitance after 1000 hr" and "Capacitance maintaining ratio".

The amount of gas generated was measured as follows. Internal pressure of a cell after the endurance test was increased by the gas generated. Therefore, a syringe was inserted into the cell and the generated gas was removed until the internal pressure returned to normal pressure. The amount of gas collected in the syringe was defined as the amount of gas generated by decomposition. In addition, in the case in which the generated amount of gas in Comparative Example 1 was defined as 100, the ratio of reduction of generated gas amount in each Example was measured. The results are shown in Table 1.

Figure 4:
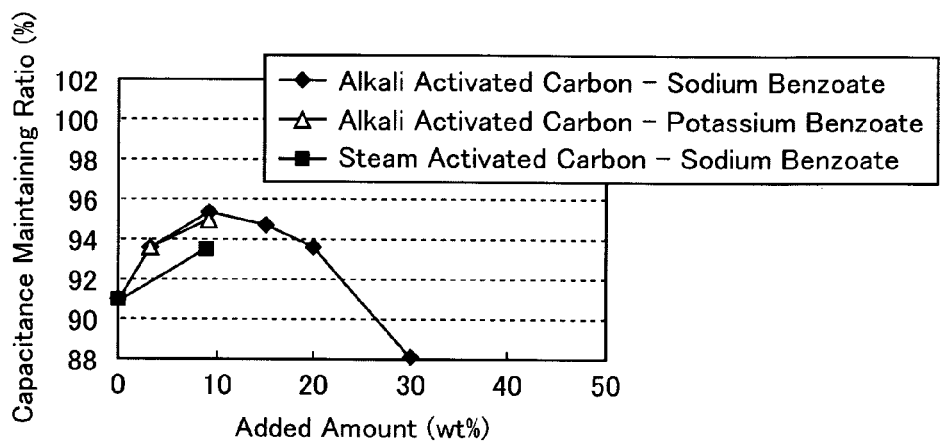
FIG. 4 is a graph showing the relationship of the capacitance maintaining ratio and the amount of antacid agent contained in the Example and Comparative Example.
Figure 5:
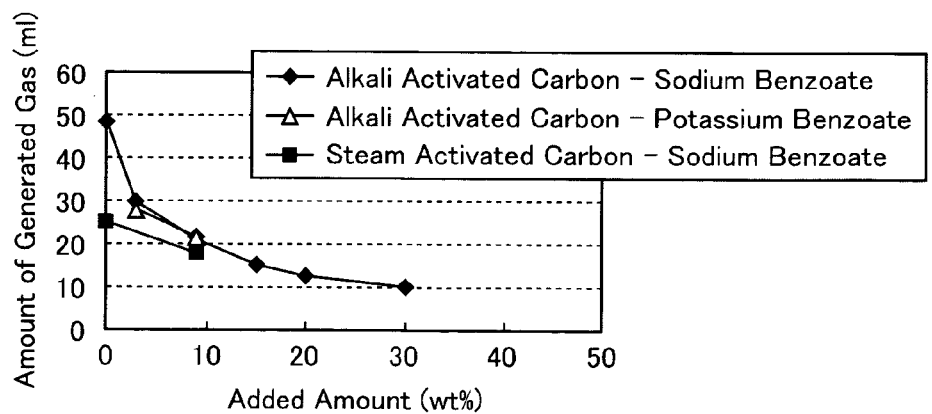
FIG. 5 is a graph showing the relationship of the amount of generated gas and the amount of antacid agent contained in the Example and Comparative Example.

Furthermore, graphs showing relationships of each measured value in Examples and Comparative Examples mentioned above and contained amount of antacid agent, are shown in FIGS. 2 to 5.

TABLE 1

| | Activated Carbon | Antacid Agent | Added Amount (wt %) | Initial Internal Resistance (mΩ) | Initial Capacitance (F) | Capacitance after 1,000 hours (F) | Capacitance Maintaining Ratio (%) | Amount of Generated Gas (ml) | Reduction Ration (%) | Electrode Density (g/cm$^3$) |
|---|---|---|---|---|---|---|---|---|---|---|
| Example 1 | Alkali Activated Carbon | Sodium Benzoate | 3 | 3.1 | 2006 | 1876 | 93.5 | 30 | 63 | 0.86 |
| Example 2 | Alkali Activated Carbon | Sodium Benzoate | 9 | 3.2 | 2098 | 2000 | 95.3 | 21 | 44 | 0.94 |
| Example 3 | Alkali Activated Carbon | Sodium Benzoate | 15 | 4.0 | 2058 | 1947 | 94.6 | 15 | 31 | 0.96 |
| Example 4 | Alkali Activated Carbon | Sodium Benzoate | 20 | 4.2 | 1959 | 1832 | 93.5 | 12 | 25 | 0.97 |
| Example 5 | Alkali Activated Carbon | Sodium Benzoate | 30 | 4.8 | 1631 | 1435 | 88.0 | 10 | 21 | 0.97 |

TABLE 1-continued

|  | Activated Carbon | Antacid Agent | Added Amount (wt %) | Initial Internal Resistance (mΩ) | Initial Capacitance (F) | Capacitance after 1,000 hours (F) | Capacitance Maintaining Ratio (%) | Amount of Generated Gas (ml) | Reduction Ration (%) | Electrode Density (g/cm³) |
|---|---|---|---|---|---|---|---|---|---|---|
| Example 6 | Alkali Activated Carbon | Potassium Benzoate | 3 | 3.1 | 2006 | 1876 | 93.5 | 28 | 58 | 0.86 |
| Example 7 | Alkali Activated Carbon | Potassium Benzoate | 9 | 3.2 | 2057 | 1954 | 95.0 | 21 | 44 | 0.94 |
| Example 8 | Steam Activated Carbon | Sodium Benzoate | 9 | 3.0 | 1279 | 1196 | 93.5 | 18 | 72 | 0.71 |
| Example 9 | Alkali Activated Carbon | Addition in Electrolyte Solution |  | 3.3 | 1972 | 1844 | 93.5 | 16 | 64 | 0.84 |
| Comparative Example 1 | Alkali Activated Carbon | None | 0 | 3.2 | 1972 | 1791 | 90.8 | 48 | 100 | 0.84 |
| Comparative Example 2 | Steam Activated Carbon | None | 0 | 2.9 | 1326 | 1207 | 91.0 | 25 | 100 | 0.67 |

As is clear from Table 1 and FIGS. 2 to 5, the capacitance maintaining ratio was improved and the generated amount of gas was reduced by adding the antacid agent (alkali metal salt of an organic acid). In particular, when the added amount of the antacid agent was 3 to 30 weight %, the effect of reducing the amount of generated gas was remarkable, and moreover, when the added amount was 3 to 15 weight %, the initial capacitance was clearly improved by combining the effect of improving density due to the addition, and the capacitance maintaining ratio was superior.

In addition, as is apparent from the results of the Examples 6 and 7, it was shown that the effect of the present invention could be obtained even if a different metal salt were used as an antacid agent, although the case using K salt was slightly superior to the case using Na salt. Furthermore, as is apparent from the result of the Example 8, it was also shown that the present invention was not limited to use of the alkali activated carbon. Additionally, as is apparent from the result of the Example 9, it was also shown that addition of the antacid agent to the electrolytic solution was effective.

What is claimed is:

1. An electric double layer capacitor comprising:
   activated carbon polarized electrodes;
   nonaqueous electrolyte solution; and
   an antacid agent comprising an alkali metal salt of an organic acid, wherein the alkali metal salt of an organic acid is R-COOM, R-OM, or R-$SO_3$M (M is sodium or potassium, and R is alkyl group having a carbon number of 4 or more).

2. The electric double layer capacitor according to claim 1, wherein the alkali metal salt of an organic acid is contained in the nonaqueous electrolyte solution.

3. The electric double layer capacitor according to claim 1, wherein the alkali metal salt of organic acid is contained in the activated carbon polarized electrodes.

4. The electric double layer capacitor according to claim 1, wherein the alkali metal salt of an organic acid is potassium salt or sodium salt.

5. The electric double layer capacitor according to claim 1, wherein the alkali metal salt of an organic acid is a benzoate.

6. The electric double layer capacitor according to claim 5, wherein the benzoate is contained at 0.5 to 30 weight % in the nonaqueous electrolyte solution.

7. The electric double layer capacitor according to claim 5, wherein the benzoate is contained at 3 to 30 weight % in the nonaqueous electrolyte solution.

8. The electric double layer capacitor according to claim 1, wherein the electrolyte anion of the nonaqueous electrolyte solution includes at least one of $BF_4^-$ and $PF_6^-$.

9. The electric double layer capacitor according to claim 8, wherein the content of the electrolyte is 0.8 to 6.0 mol/L.

* * * * *